Figure 5:
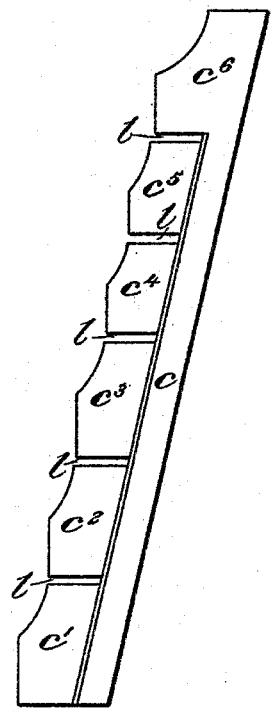

(No Model.) 3 Sheets—Sheet 1.
A. FORBES & A. G. O'NEIL.
SEED RACK.
No. 515,580. Patented Feb. 27, 1894.
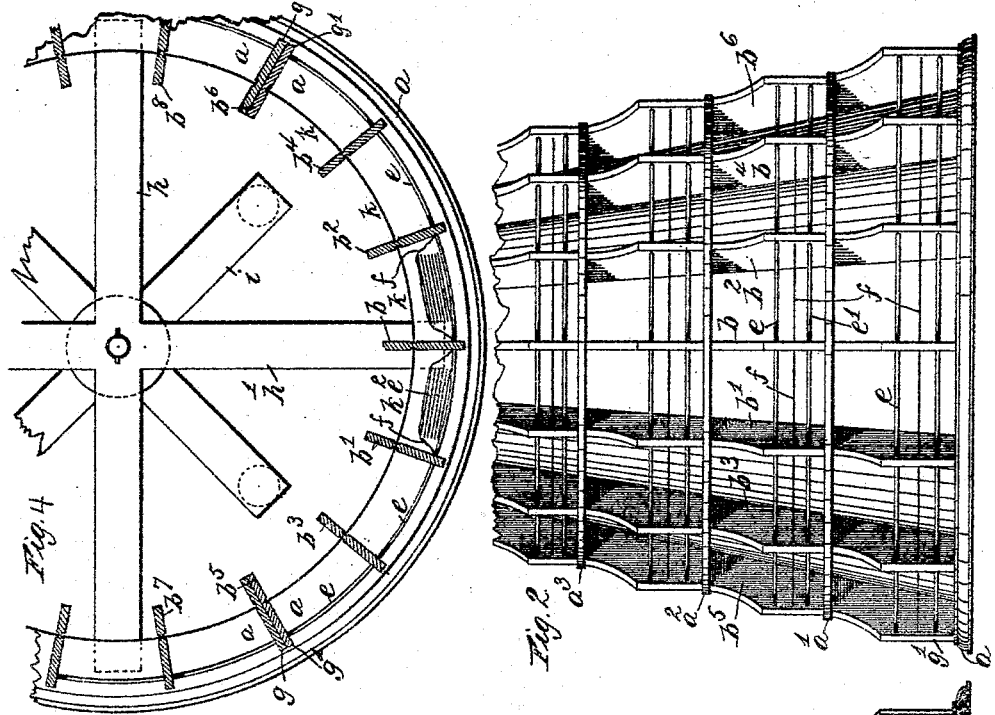
Witnesses
Fred Kemper
J. E. Greer.
Inventors
Alexander Forbes
Alexander G. O'Neil
By their Attorneys
Gifford & Law

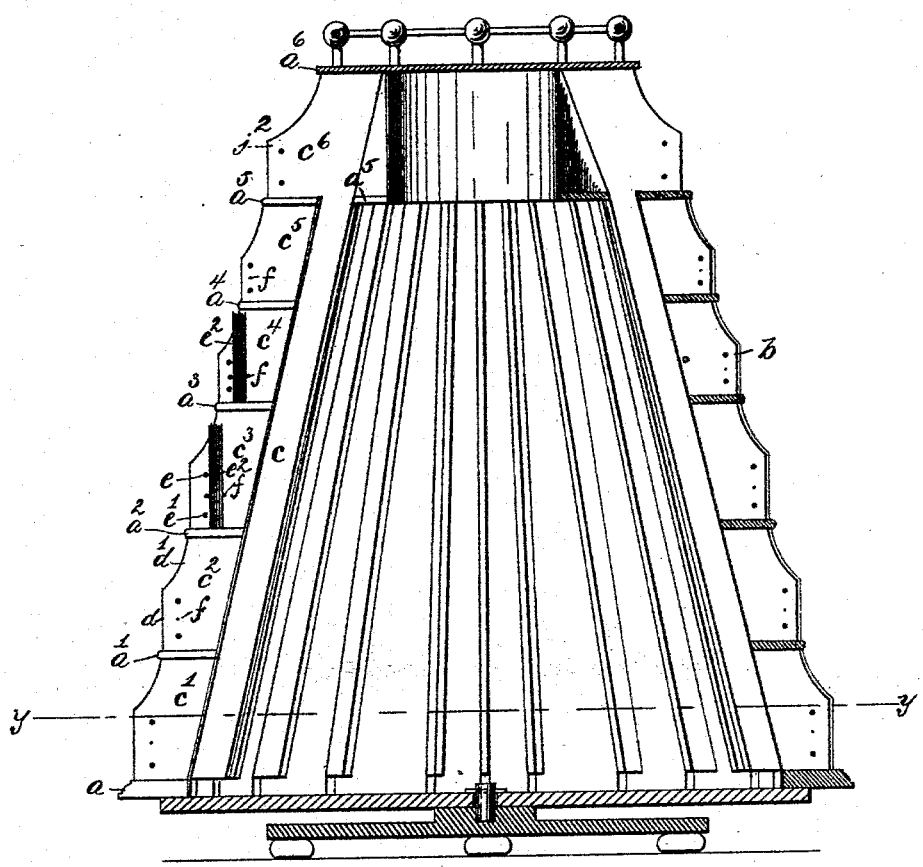

(No Model.) 3 Sheets—Sheet 3.

A. FORBES & A. G. O'NEIL.
SEED RACK.

No. 515,580. Patented Feb. 27, 1894.

Witnesses:—

Inventors
Alex. Forbes &
Alex. G. O'Neil
By their Attorneys
Gifford & Saw.

UNITED STATES PATENT OFFICE.

ALEXANDER FORBES, OF JERSEY CITY, NEW JERSEY, AND ALEXANDER G. O'NEIL, OF NEW YORK, N. Y., ASSIGNORS TO THE PETER HENDERSON & COMPANY, OF NEW JERSEY.

SEED-RACK.

SPECIFICATION forming part of Letters Patent No. 515,580, dated February 27, 1894.

Application filed November 21, 1892. Serial No. 452,708. (No model.)

*To all whom it may concern:*

Be it known that we, ALEXANDER FORBES, of Jersey City, in the State of New Jersey, and ALEXANDER G. O'NEIL, of New York, in the State of New York, have invented a new and useful Seed-Rack, of which the following is a specification.

This seed rack enables garden seeds contained in envelopes to be presented in such manner that the label on the outside of the envelope is displayed; that upon the front envelope being withdrawn, the envelope behind it will occupy its place; that each series of envelopes is held in a uniform position; and that the whole case may be made so economically that its use is not prohibited by expense of construction.

In the drawings, Figure 1 is an elevation of the rack. Fig. 2 is an elevation of the lower part of one section of it detached. Fig. 3 is a vertical section on the line $x\,x$ of Fig. 1. Fig. 4 is a horizontal section on the line $y\,y$ of Fig. 3. Fig. 5 is a side view of one of the ribs detached.

When the rack is completed ready for use, as shown in Fig. 1, it contains a series of horizontal rings or annular shelves, $a\,a'$, $a^2$, $a^3$, $a^4$, $a^5$ arranged at a suitable distance apart around a common axis, one above another; each succeeding member of the ascending series being smaller in diameter than the ring beneath it. It also contains a series of flat ribs $b$, $b'$, $b^2$, &c., arranged in vertical planes radiating from a common center. These ribs converge toward the top correspondingly with the decreasing diameters of the horizontal rings so that the general effect is that of the frustum of a cone. Each rib is wider than a ring and contains a notch $l$ to receive each ring extending from its outward edge inwardly; so that each rib may be considered as composed of several parts; the part $c$ (Figs. 3 and 4) extending from the top piece $a^6$ to the ring $a$ at or near the bottom; and the parts $c'$, $c^2$, $c^3$, $c^4$, $c^5$ and $c^6$ each of which projects from the part $c$ between two of the rings or shelves $a\,a'$, &c., so as to partition the spaces between those shelves into pigeon-holes. Each of the parts $c'\,c^2$, &c., is so constructed that adjacent to the shelf beneath it, its edge $d$ (Fig. 3) is substantially vertical; whereas, its edge $d^2$ adjacent to the shelf above it is inclined or curved so as to extend from the edge of the shelf downward and outward to the top of the vertical portion $d$. Immediately at the rear edge of the shelves, every two adjacent ribs may be grooved (Fig. 4) from top to bottom; such grooves forming guideways for a strip of pasteboard $k$ to be slid into position between each two ribs so as to form a back for each series of the pigeon-holes from top to bottom. Two rods or wires $e$ and $e'$ bent into circular form, one vertically above the other, extend through the ribs near their vertical portion $d$, as shown, and serve as a skeleton front support in each pigeon-hole for its contents $e^2$. A yielding back support is also provided which may be of the following construction. Between the wires a band $f$ of rubber or other elastic material, is passed through the ribs, as shown, to serve in each pigeon-hole as a back support for its contents; the band being stretched backward when the seed envelopes are inserted to admit the envelopes between it and the front wires, as shown in Fig. 4. We do not wish to be understood as limited to this form of yielding back unless in such claims as contain such express limitation, though we regard it as far superior to any other form.

The structure shown in the drawings, is made in three sections, the lower part of one of which is shown in Fig. 2. At the junction between each two sections, two of the ribs as at $g\,g'$ (Fig. 4) come together side by side, and the ends of the several sections of each ring or shelf abut against each other.

As above described, we produce at little cost a hollow structure in the form of the frustum of a cone, the exterior surface of which is composed of pigeon-holes or pockets and each provided with means for holding the seed envelopes vertically or nearly so, so that they are not only exposed to view in the most advantageous position, but so that the tops of each series of envelopes are held outward beyond the shelf or ring above and in position to be readily accessible for removal.

$h\,h'$ are cross bars at the bottom resting upon a central pedestal $i$ to which they are pivotally connected so that the whole stand may revolve. Upon the top of the structure already described, pigeon-holes may be arranged, as shown, to receive larger seeds that require to be contained in boxes. These pigeon-holes may be provided by arranging a top horizontal piece $a^6$ a suitable distance above the shelf $a^5$. The upper portions $c^6$ (Figs. 3 and 4) of the ribs serve as the partitions $j\ j'$, &c., corresponding in general form with the partitions below and connected by similar wires.

Although we have shown the rack as conical (the frustum of a cone) in shape, yet, obviously, it might be made as an equivalent form pyramidal (the frustum of a pyramid).

We claim—

1. A seed rack, the sides of which recede from the bottom upward and are composed of pigeon holes arranged side by side and one above the other and the bottom of each extending under and forward of the bottom of an upper pigeon hole, a front support to each, and a yielding back support whereby the contents of the pigeon hole are held forward of the receding upper portion of the rack, substantially as described.

2. A seed rack, the sides of which recede from the bottom upward and are composed of pigeon holes each provided with a front support, and with an elastic band extending transversely across the pigeon hole to serve as a back support, substantially as described.

3. In combination, a series of annular shelves, a series of intercepting radial ribs whereby the spaces between the shelves are divided into pigeon holes, a front support in each pigeon hole and an elastic band extending transversely across the pigeon hole to act as a back support, substantially as described.

4. In a seed rack, a pigeon hole composed of the sides $b\ b^2$ the front edge of each of which is approximately vertical near the bottom and recedes near the top, the upper shelf $a^2$ and the lower shelf $a'$ projecting forward of the same, the rods $e\ e'$ connecting the front vertical edges of the sides and the elastic band $f$ connecting the sides between the rods substantially as described.

ALEXANDER FORBES.
ALEXANDER G. O'NEIL.

Witnesses:
FRED S. KEMPER,
J. E. GREER.